United States Patent
Ahunai et al.

(10) Patent No.: US 11,481,719 B2
(45) Date of Patent: Oct. 25, 2022

(54) SYSTEM AND METHOD FOR FACILITATING GOODS OR SERVICE RELATED ACTIVITY

(71) Applicants: ENERGY ABSOLUTE PUBLIC COMPANY LIMITED, Bangkok (TH); BLOCKFINT COMPANY LIMITED, Bangkok (TH)

(72) Inventors: Somphote Ahunai, Bangkok (TH); Wichai Patipaporn, Bangkok (TH); Shimmy Thomas, Bangkok (TH); Suttipong Kanakakorn, Bangkok (TH)

(73) Assignee: ENERGY ABSOLUTE PUBLIC COMPANY LIMITED, Bangkok (TH)

(*) Notice: Subject to any disclaimer, the term of this patent is extended or adjusted under 35 U.S.C. 154(b) by 320 days.

(21) Appl. No.: 16/205,133

(22) Filed: Nov. 29, 2018

(65) Prior Publication Data

US 2020/0143325 A1    May 7, 2020

(30) Foreign Application Priority Data

Nov. 1, 2018  (SG) .......................... 10201809712X

(51) Int. Cl.
G06Q 10/08      (2012.01)
G06F 16/901     (2019.01)

(52) U.S. Cl.
CPC ..... *G06Q 10/08355* (2013.01); *G06F 16/901* (2019.01)

(58) Field of Classification Search
CPC .. G06Q 10/08355; G06Q 10/10; G06Q 50/06; G06F 16/901; Y02P 90/845
(Continued)

(56) References Cited

U.S. PATENT DOCUMENTS 6,598,029 B1 * 7/2003  Johnson .............. G06Q 10/04
                                                          705/37
8,583,520 B1 * 11/2013 Forbes, Jr. ............ G06Q 10/00
                                                          705/34

(Continued)

FOREIGN PATENT DOCUMENTS

CN    104268637 A    1/2015
CN    105354633 A    2/2016
(Continued)

OTHER PUBLICATIONS

Nireekshana et al., Locational Marginal Pricing Calculation with Rescheduling of Generation in Deregulation, Jun. 2012, International Journal of Engineering Research and Development, vol. 1, Issue 5, pp. 61-68 (Year: 2012).*

(Continued)

*Primary Examiner* — Resha Desai
*Assistant Examiner* — Lisa Ma
(74) *Attorney, Agent, or Firm* — JCIP; Joseph G. Chu; Jeremy I. Maynard

(57) ABSTRACT

A system and method for facilitating goods or service related activity is disclosed. The system for facilitating goods or service related activity may comprise a database storing goods or service related information which is provided by at least one provider; and a processor operable to receive a request associated with the goods or service related activity from a requester; wherein the processor is operable to analyse a plurality of routes that the at least one provider can provide the goods or service to the requester, using the goods or service related information, in order to select at least one route among the plurality of routes; and match the requester with a provider associated with the selected route.

12 Claims, 5 Drawing Sheets

(58) Field of Classification Search
USPC .......................................................... 705/338
See application file for complete search history.

(56) References Cited

U.S. PATENT DOCUMENTS

| | | | |
|---|---|---|---|
| 2010/0179704 A1* | 7/2010 | Ozog ................. | H02J 13/0006 700/291 |
| 2010/0218108 A1* | 8/2010 | Crabtree ............... | G06Q 50/06 715/738 |
| 2010/0332373 A1* | 12/2010 | Crabtree ............... | G06Q 40/04 705/37 |
| 2015/0330800 A1 | 11/2015 | Huyi | |
| 2016/0005118 A1* | 1/2016 | Mashinsky ............ | G06Q 40/04 705/37 |
| 2017/0358041 A1* | 12/2017 | Forbes, Jr ............. | G06Q 20/02 |
| 2018/0299852 A1 | 10/2018 | Orsini | |
| 2019/0353685 A1* | 11/2019 | Almeida Cavoto . | G06Q 20/145 |
| 2021/0098988 A1* | 4/2021 | Gokhale ............... | G06Q 50/06 |

FOREIGN PATENT DOCUMENTS

| | | | |
|---|---|---|---|
| JP | 2003091659 A | 3/2003 | |
| JP | 2003323559 A | 11/2003 | |
| JP | 2004192473 A | 7/2004 | |
| WO | WO-2017092788 A1 * | 6/2017 | ............... G01D 4/10 |

OTHER PUBLICATIONS

Kodali et al., "Blockchain Based Energy Trading," Oct. 2018, IEEE, Tencon 2018 Region 10 Conference, pp. 1778-1783 (Year: 2018).*
Anak Agung Gde Agung, Rini Handayani, "Blockchain for smart grid" Journal of King Saud University—Computer and Information Sciences, vol. 34, Issue 3, https://www.sciencedirect.com/science/article/pii/S1319157819309000 (Year: 2020).*
Extended European Search Report of Application No. EP18207433.
Examination Report of Intellectual Property Office of Singapore of Application No. 10201809712X.
Blockchain and Its Potential Application in Electricity Sector, What is Blockchain and How Does it Work?, Squire Patton Boggs, John Danahy and Rob Broom, Lexology, Jun. 13, 2018.
Bob Shively, Energy Insider: Future of Energy,Trading electricity using blockchain technology, https://www.enerdynamics.com/Energy-Insider_Blog/Trading-Electricity-Using-Blockchain-Technology.aspx.
P. Faria and Z. Vale, Demand Response in Electrical Energy supply: An Optimal Real Time Pricing Approach, Energy, Elsevier, 2011, 36(8), pp. 5374. <10.1016/j.energy.2011.06.049>. <hal-00784908>.
Collin Cain, M.Sc. and Jonathan Lesser, Ph.D, A Common Sense Guide to Wholesale Electric Markets, Apr. 2007 Bates White Economic Consulting, pp. 1-42.

* cited by examiner

SYSTEM AND METHOD FOR FACILITATING GOODS OR SERVICE RELATED ACTIVITY

RELATED APPLICATION

This application claims priority to, and the benefits of, Singapore Patent Application No. 10201809712X with the filing date of Nov. 1, 2018, the content of which is incorporated in its entirety herein by reference.

FIELD OF INVENTION

The present invention relates to a system and method for facilitating goods or service related activity.

BACKGROUND ART

The following discussion of the background to the invention is intended to facilitate an understanding of the present invention only. It may be appreciated that the discussion is not an acknowledgement or admission that any of the material referred to was published, known or part of the common general knowledge of the person skilled in the art in any jurisdiction as at the priority date of the invention.

Goods or service related activities, for example a transaction of a product, which can also include trading of a commodity in various industries had traditionally required at least bilateral involvement from production/creation of the goods or service to consumption by consumers.

However, with development of industries, multilateral involvement is increasingly required for the transaction of the product. For example, for a transaction of a type of energy, there may include multiple participants such as a producer who produces the energy, a trader who trades the energy and a consumer who purchases and consumes the energy, a transmission system operator (TSO) and a distribution system operator (DSO) in the respective area participate in delivery and distribution of the energy to the consumer. With improvements in technology and globalization, participants have increased and diversified to include exporters, importers, resellers, financiers and/or insurance parties.

With the increased number of participants, greater choice of product options relating to the participants is available. Hence, the consumer may face complex processes/decisions for purchasing the product. The decisions may in turn be affected by factors related to goods or service related information, for example product related information such as price, quality, quantity, delivery time, delivery place, etc., and the same may relate to the choices of various participants.

In light of the foregoing, it is not straightforward for the producer or trader to provide an optimal product offering to the consumer based on the consumer's complex needs. As the product related information relates to the various participants in various systems, the producer or trader typically face challenges matching the needs of the consumer. The matching process requires sorting through the product related information manually and then preparing the product offer for the transaction. The manual matching process is laborious, inefficient and not thorough, and thereby does not guarantee the optimal offer to the consumer.

In light of the above, there exists a need for a better supply-side and demand-side matching of the product and the needs. There exists a further need to provide a solution that meets the mentioned needs or alleviates the challenges at least in part.

SUMMARY OF THE INVENTION

The present invention seeks to provide a system and method that addresses the aforementioned needs at least in part.

Throughout the specification, unless the context requires otherwise, the word "comprise" or variations such as "comprises" or "comprising", will be understood to imply the inclusion of a stated integer or group of integers but not the exclusion of any other integer or group of integers.

Furthermore, throughout the specification, unless the context requires otherwise, the word "include" or variations such as "includes" or "including", will be understood to imply the inclusion of a stated integer or group of integers but not the exclusion of any other integer or group of integers.

The invention seeks to provide a matching system between the parties who are involved in the goods or service related activities.

The technical solution is provided in the form of a system and method for facilitating goods or service related activity. In particular, the system comprises a database storing goods or service related information which is provided by at least one provider. The information may be stored in a centralized database and/or a decentralized database such as a distributed ledger.

Once a processor receives a request associated with the goods or service related activity from a requester, the processor is operable to analyse a plurality of routes that the at least one provider can provide the goods or service to the requester, using the stored information. Thereafter, at least one route among the plurality of routes can be selected. The selected route may be an optimal or near optimal route which satisfies the requester's request. In this manner, the processor is operable to provide an optimal matching between the requester and the provider, for the activity, without manual and laborious matching work.

In one aspect, there is a system for facilitating goods or service related activity comprising: a database storing goods or service related information which is provided by at least one provider; and a processor operable to receive a request associated with the goods or service related activity from a requester; wherein the processor is operable to analyse plurality of routes that the at least one provider can provide the goods or service to the requester, using the goods or service related information, in order to select at least one route among the plurality of routes; and match the requester with a provider associated with the selected route.

In some embodiments, the processor is operable to calculate costs for the plurality of routes based on the goods or service related information which is provided by the at least one provider.

In some embodiments, the goods or service related information include at least one of the following: producer related information, transmission related information or storage related information.

In some embodiments, the costs are calculated based on the following mathematical expression:—

$$\min \sum_{i \in [n]} \left( (P_i + Pdecay_i) \times p_i + \sum_{j \in [k(i)]} (Tloss_{ij} \times p_{ij} + Tcost_{ij}) \right)$$

wherein $[n]=\{1,2,3, \ldots (n-1), n\}$ is the set of providers, $[k(i)]$ is the set of connected transmission lines between the requester and the at least one provider, p is the unit price, P is the power source, Tloss is the power loss in a transmission line (ij), Tcost is a cost of the transmission line (ij), i belongs to the set [n] i.e. {i} is a non-empty subset of [n], j belongs to the set [k(i)] i.e. {j} is a non-empty subset of [k(i)], and Pdecay is a power decay constant. Note that no time dependence is associated with the variables and parameters of this cost formula. It is understood that it corresponds to an instantaneous or near-instantaneous measure.

In some embodiments, the processor is operable to list the plurality of routes that the at least one provider can provide the goods or service to the requester.

In some embodiments, the processor is operable to sort the plurality of routes based on the goods or service related information associated with the request, in order to select the at least one route.

In some embodiments, the processor is operable to filter the plurality of routes based on the goods or service related information associated with the request, in order to select the at least one route.

In some embodiments, the processor is operable to provide the requester with options of routes so that the requester can select the at least one route.

In some embodiments, the processor is operable to select the at least one route based on the analysis.

In some embodiments, the processor is operable to send details of the selected route to the requester; and the requester is operable to send a confirmation of the selected route to the processor.

In some embodiments, the processor is operable to reserve the goods or service related activity to the provider associated with the selected route.

In some embodiments, the processor is operable to update the database to record the goods or service related activity.

In some embodiments, the processor is operable to allow the requester to provide a feedback for the provider associated with the selected route, and record the feedback on the database.

In some embodiments, the database includes at least one of a centralized database or a decentralized database.

In some embodiments, the decentralized database includes a distributed ledger.

In some embodiments, the distributed ledger comprises a plurality of blocks, and each block of the plurality of blocks stores the goods or service related information.

In some embodiments, the processor is operable to execute a smart contract between the requester and the provider associated with the selected route.

In some embodiments, the request contains at least one of the following information:

desired location, capacity, time or duration.

In some embodiments, there is a method for facilitating goods or service related activity comprising: storing goods or service related information which is provided by at least one provider; receiving a request associated with the goods or service related activity from a requester; analysing plurality of routes that the at least one provider can provide the goods or service to the requester, using the goods or service related information; selecting the at least one route among the plurality of routes; and matching the requester with a provider associated with the selected route.

In some embodiments, the step of analysing comprises a step of calculating costs for the plurality of routes based on the goods or service related information which is provided by the at least one provider.

Other aspects of the invention may be apparent to those of ordinary skilled in the art upon review of the following description of specific embodiments of the invention in conjunction with the accompanying drawings.

BRIEF DESCRIPTION OF THE DRAWINGS

The present invention will now be described, by way of example only, with reference to the accompanying drawings, in which.

Other arrangements of the invention are possible and, consequently, the accompanying drawings are not to be understood as superseding the generality of the preceding description of the invention.

DESCRIPTION OF EMBODIMENTS OF THE INVENTION

There are a plurality of parties who are involved in goods or service related activities. The parties perform the goods or service related activities. It may be appreciated that the goods or service may relate to at least one industry. The industry may include, but not be limited to, utility industry, logistics industry or food industry. The utility may include, but not be limited to, energy, water, electricity, oil or gas. For example, in an energy industry, the energy related activities may include, but not be limited to, energy transactions such as sale, purchase, trade, transmission, storage, distribution or consumption. For example, in a time sensitive or perishable goods related industry, for example food industry, the foods related activities may include, but not be limited to, food transactions such as harvest, production, storage, transmission or consumption.

Throughout the description, the parties who are involved in the goods or service related activities may include a requester 120 and a provider 130. The requester 120 and the provider 130 may include, but not be limited to, at least one producer, at least one intermediaries which include one or more of the following:—at least one trader, at least one transmission operator, at least one distribution operator, at least one storage operator, and at least one consumer.

It may be appreciated that what the provider is and what the requester is may be relative each other, and at different stage/phase along the producer/consumer line the roles of intermediaries such as may change. For example, a producer such as a windmill power plant may be a provider. A storage operator, for example an operator of a power storage facility, or other intermediaries may be both a provider of goods and service and consumer, and hence may be a requester during charging from the producer, and a provider during discharging to a transmission operator or a consumer. It may also be appreciated that each of these parties can have its own the goods or service related information, for example energy related information such as its price or its property.

Figure 1:
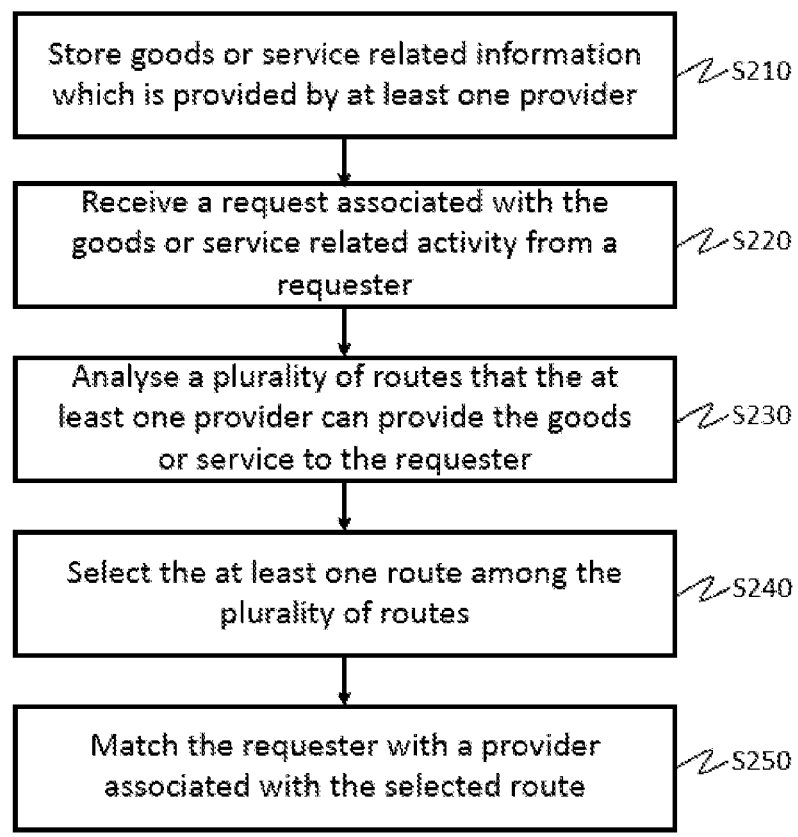
FIG. 1 shows a flow diagram in accordance with some embodiments of the present invention.

FIG. 1 shows a flow diagram in accordance with some embodiments of the present invention.

The system 100 may comprise a processor 110, at least one requester 120 and at least one provider 130. The processor 110 may include at least one of a centralized processor, a decentralized processor or a combination of them. The processor 110 is operable to communicate with a database (not shown), the requesters 120 and the providers 130. In some embodiments the processor 110 includes a cloud-based computer network.

In some embodiments, the processor 110 may comprise a system module (not shown) and a settlement module (not shown). The system module is operable to communicate with the requesters 120, and the settlement module is operable to communicate with the providers 130. The system module and the settlement module can communicate with each other.

The database may include at least one of a centralized database, a decentralized database or a combination of them. The database is operable to store goods or service related information which is provided by at least one provider 130 (S210). In some embodiments, the providers 130 may periodically or non-periodically provide the goods or service related information to the database, and the database may update its information accordingly. In some embodiments, the providers 130 may provide the information with the database once there are any changes on the information. In some embodiments, the providers 130 may select at least a part of the information to be provided to the database.

It may be appreciated that the goods or service related information, for example energy related information, depends on the type of the providers 130. Examples of the providers 130 include producer, and intermediaries such as transmission operator or storage operator. The energy related information may therefore include, but not be limited to, at least one of producer related information, transmission related information or storage related information. For example, if the provider 130 is a producer such as a windmill power plant, the energy related information which relate to the producer may include, but not be limited to, price, quality or quantity of the produced energy (e.g. electrical energy converted from wind energy).

Although not shown, in some embodiments, a single provider 130 can provide a plurality of goods and/or services. For example, the single provider 130 may operate as a transmission operator as well as a producer. It may be appreciated that the energy related information may relate to the transmission as well as the producer. For example, the energy related information may include, but not be limited to, delivery time, delivery fees or available delivery place as well as price, quality and/or quantity of the produced energy.

A requester 120 may generate a request associated with the goods or service related activity, for example an energy related activity. The requester 120 may specify one or more goods or service related information, for example energy related information. It may be appreciated that the energy related information may include details of the energy that the requester 120 wishes to purchase. For example, quantity of energy the requester 120 wishes to purchase at a specific point can be contained in the request in the form of capacity or units of energy as the energy related information.

The request may contain one or more energy related information such as price, quality, quantity, delivery time, duration, delivery place, etc. For example, if a requester 120 is a consumer of the energy, the request for purchase of the energy may contain a property of the energy to be purchased, desired price, desired quantity and desired delivery date.

The requester 120 may send the request to the processor 110. The processor 110 may then receive the request from the requester 120 (S220). The processor 110 may figure out the energy related activity based on the received request.

It may be appreciated that there is at least one provider 130 who can sell the energy that the requester 120 wishes to purchase. The processor 110 may then analyse a plurality of routes that the at least one provider 130 can provide the goods or service, for example the energy, to the requester 120 (S230). The processor 110 may use the energy related information to analyse the plurality of routes. It may be appreciated that in some embodiments, the processor 110 may use the energy related information which is associated with the received request to analyse the plurality of routes.

In some embodiments, the step of analysing may include a step of listing the plurality of routes that the at least one provider can provide the energy to the requester. In some embodiments, the processor 110 is operable to list all the routes connecting between the providers and the requester. In some embodiments, the processor 110 is operable to select and list routes which are available in relation to the request, among all the routes.

In some embodiments, the step of analysing may include a step of sorting the plurality of routes based on the energy related information associated with the request, in order to select the at least one route. The processor 110 may sort the listed routes based on the energy related information such as price, quality, quantity, decay, delivery time, duration, delivery place, etc. contained in the request. For example, the processor 110 may sort the listed routes by price. The listed routes may be sorted into high price routes and low price routes. As another example, the processor 110 may sort the listed routes by quality, which can include reliability of service. The listed routes may be sorted into routes that can provide an energy certified as a good quality energy and/or reliability of the energy transmission. To this end the processor 110 may provide a ranking system in relation to the reliability provided by the transmission providers, for example. As yet another example, the processor 110 may sort the listed routes by delivery time.

In some embodiments, the step of analysing may include a step of filtering the plurality of routes based on the energy related information associated with the request, in order to select the at least one route. For example, the processor 110 may list only routes that provides green energy.

In some embodiments, the step of analysing may include a step of calculating costs for the plurality of routes. The processor 110 can calculate the costs for the routes based on the energy related information. The calculation of the costs may be used to sort and/or filter the routes. The costs may be calculated based on the following mathematical expression:—

$$\min \sum_{i \in [n]} \left( (P_i + Pdecay_i) \times p_i + \sum_{j \in [k(i)]} (Tloss_{ij} \times p_{ij} + Tcost_{ij}) \right)$$

wherein $[n]=\{1, 2, 3, \ldots (n-1), n\}$ is the set of providers, $[k(i)]$ is the set of connected transmission lines between the requester and the at least one provider, p is the unit price, P is the power source, Tloss is the power loss in a transmission line (ij), Tcost is a cost of the transmission line (ij), i belongs to the set [n] i.e. i is a non-empty subset of [n], j belongs to the set [k(i)] i.e. j is a non-empty subset of [k(i)], and Pdecay is a power decay constant. The processor 110 may list the calculated costs and sort and/or filter the same.

Thereafter, at least one route among the routes may be selected (S240). The selection may be based on the analysis of the routes and/or the goods or service related information, for example energy related information. The processor 110 may receive a selection of the at least one route from the requester 120 and/or the processor 110.

In some embodiments, the processor 110 may provide the requester 120 with options of routes so that the requester 120 can select the at least one route among the routes. The processor 110 may use the analysis of the routes and/or the energy related information to list the options of routes. The requester 120 may select the at least one route and inform the selected route to the processor 110. It may be appreciated that the requester 120 can select the at least one route based on the analysis of the routes, the energy related information and/or the requester's 120 preference.

In some embodiments, the processor 110 may select the at least one route. The processor 110 may use the analysis of the routes and/or the energy related information to select the at least one route. The processor 110 may send details of the selected route to the requester 120 and then the requester 120 may send a confirmation of the selected route to the processor 110. For example, the processor 110 may select a route which the calculated cost by the above equation is the least.

After the selection of the route, the processor 110 may match the requester 120 with a provider 130 associated with the selected route (S250).

In some embodiments, the processor 110 may reserve the goods or service related activity, for example energy related activity, to the provider 130 associated with the selected route. For example, the processor 110 may reserve a transmission means or a storage means associated with the matched provider 130 to prevent other requesters from using the same transmission means or storage means at the same time.

In some embodiments, the processor 110 may update the database to record the energy related activity. For example, the reservation may be recorded in the database. In some embodiments, the processor 110 may execute a smart contract between the matched requester 120 and the provider 130, and the executed smart contract may be updated on the database.

In some embodiments, the processor 110 may allow the requester 120 to provide a feedback for the matched provider 130 associated with the selected route, and record the feedback on the database.

It may be appreciated that the system 100 can incorporate a reputation scoring module (not shown) that allows the requester 120 to rate the provider 130, for example a producer, on various trust parameters such as quality of energy generated and delivered, type of energy source, green certification or carbon footprint, etc. The requester 120 can also rate other types of providers 130 who provide services in the energy marketplace such as the platform itself, transmission operators, distribution operators, storage providers, financiers, etc.

The reputation scoring module acts as a feedback mechanism for providers 130 to improve their products and/or services and for requesters 120, for example consumers, to gain better insight into which the provider 130 has better trustworthy perception.

The reputation scoring module has necessary checks and balances to ensure that the feedbacks, reviews, scores, recommendations or any other information given by the requesters 120 are reliable and the information is verified.

The technical implementation of the reputation scoring module is based on an algorithm to calculate the reputation score from the requesters 120 according to his/her subjective choice either like or dislike or the value across a scoring range. The reputation score may be calculated from the following factors: an ability of a factory to produce, an environment impact on raw goods (for example, climate), a transportation system (for example, road), political unrest, etc. The factors are put in the reputation scoring module using a machine learning algorithm to calculate the reputation score.

It may be appreciated that mining algorithms may be added to analyse data from a reputation database of the reputation scoring module. There may be a pre-scored average displayed for the requesters 120 beforehand.

In some embodiments, features and statistics may be extracted from a delivery history of goods and/or services compromising reputation data which may then be delivered as an input to the machine learning algorithm and used as training data. If the dimensionality of the reputation data is high, the dimensionality may be reduced using a spectral clustering algorithm. In this case, the reduced data may be used instead as an input to the machine learning algorithm and/or as a 2D or 3D visual representation of the reputation data.

Figure 2:
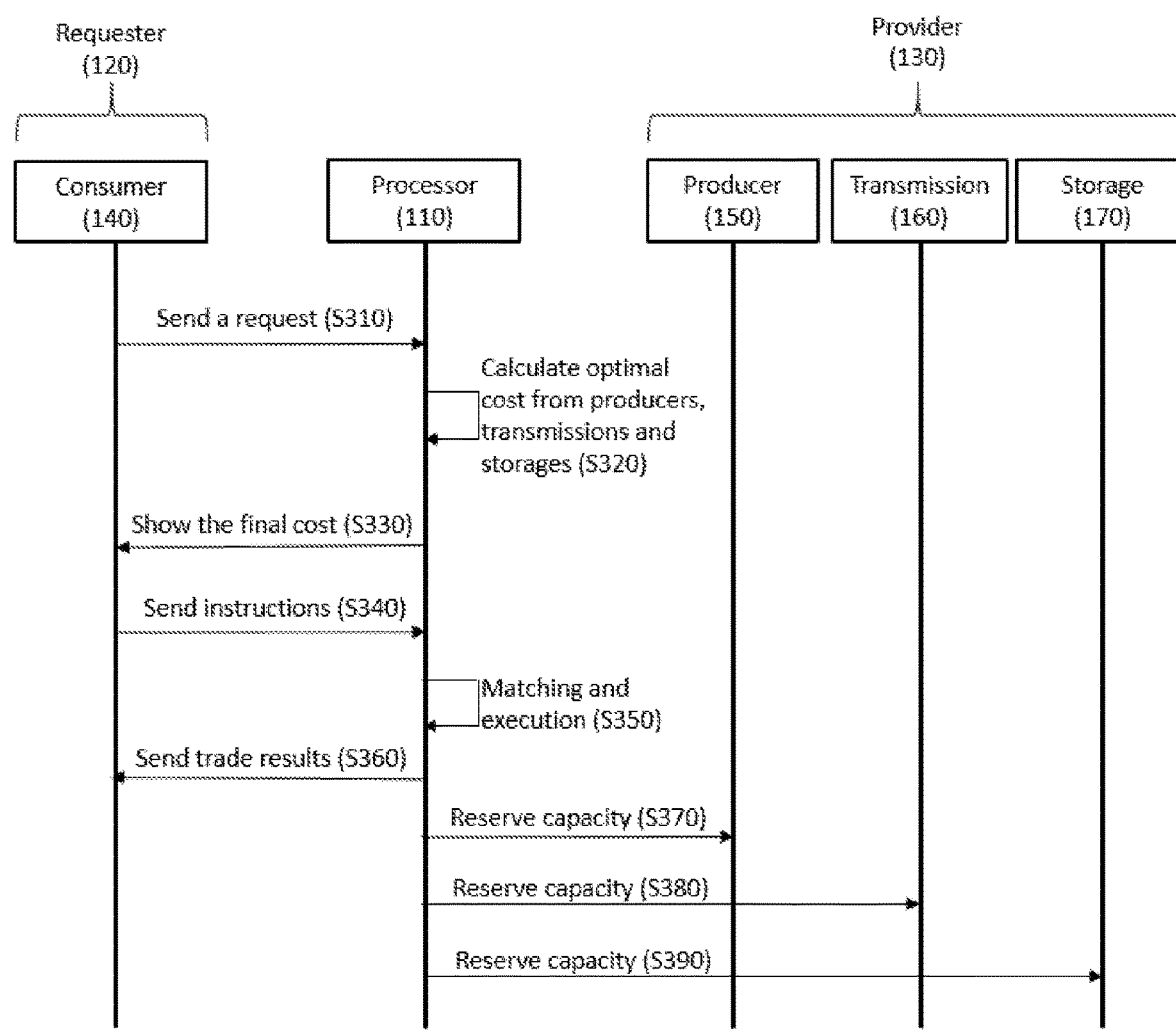
FIG. 2 shows another flow diagram in accordance with some embodiments of the present invention.

FIG. 2 shows another flow diagram in accordance with some embodiments of the present invention.

There are at least one requester 120 and at least one provider 130. As shown in FIG. 2, there is a consumer 140 as an example of the requester 120, and a producer 150, a transmission operator 160 and a storage operator 170 as examples of the provider 130. For example, the goods or service related activity may include an energy related activity.

The consumer 140 may send a request for purchase of an energy to the processor 110 (S310). The request may contain at least one energy related information such as a property of energy, desired price, desired quantity and desired delivery date.

The processor 110 may receive the request from the consumer 140 and calculate optimal cost for the transaction (S320). As there are various producers 150, transmission operators 160 and storage operators 170 available to the transaction, the processor 100 can calculate the optimal costs taking into account the producers 150, transmission operators 160 and storage operators 170.

For example, the optimal cost may be calculated based on a combination of at least one of the producers 150, at least one of the transmission operators 160 and at least one of the storage operators 170 which constitute a route satisfied with the request. As another example, the optimal cost may be the lowest cost, and the route may be a combination of at least one of the producers 150, at least one of the transmission operators 160 and at least one of the storage operators 170 which constitute a route incurring the lowest cost.

The processor 110 may show the final cost to the consumer 140 (S330). In some embodiments, the processor 110 may show the lowest cost as the final cost. In some embodiments, the processor 110 may show a few of the calculated optimal costs as the final cost. For example, the processor 110 may provide five (5) costs to the consumer 140 for the consumer's 140 selection. It may be appreciated that each cost relates to each corresponding route.

The consumer 140 may send instructions (S340) after receiving the final cost from the processor 110. In some embodiments, if the processor 110 provides one final cost to the consumer 140, the consumer 140 may send a confirmation as the instructions to the processor 110. In some embodiments, if the processor 110 provides a few of final costs to the consumer 140, the consumer 140 may select a route corresponding to one of the received final costs and inform the selected route to the processor 110.

The processor 110 may then proceed with matching and execution (S350). In some embodiments, the processor 110 may match the consumer 140 with a producer 150, a transmission operator 160 and a storage operator 170 corresponding to the route.

The processor 110 may assist in execution of a contract for the transaction between the parties. For example, the processor 110 may execute one or more smart contract(s) between the consumer 140, the producer 150, the transmission operator 160 and the storage operator 170. The smart contract may be stored in the database. The database may include, but not be limited to, a centralized database and a decentralized database such as distributed ledger. It may be appreciated that a combination of the centralized database and the decentralized database can be used.

The processor 110 may send trade results to the consumer 140 (S360). Also, the processor 110 may reserve capacity to the producer 150 (S370), the transmission operator 160 (S380) and the storage operator 170 (S390).

Figure 3:
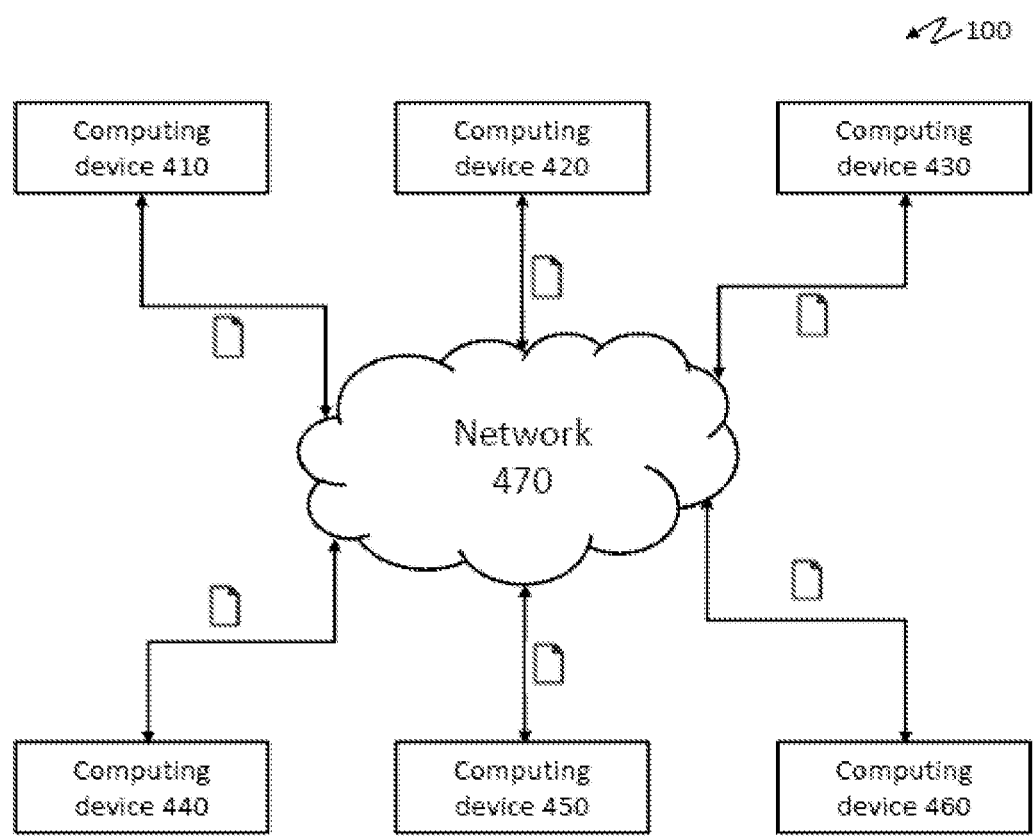
FIG. 3 shows a block diagram in accordance with some embodiments of the present invention.

FIG. 3 shows a block diagram in accordance with some embodiments of the present invention.

The system 100 may provide at least one distributed ledger across a plurality of computing devices 410, 420, 430, 440, 450 and 460. The computing devices 410, 420, 430, 440, 450 and 460 may be implemented as a plurality of nodes on the distributed ledger. The distributed ledger may include, but not be limited to, a blockchain.

The distributed ledger may comprise a plurality of blocks. In some embodiments, the distributed ledger may comprise a collection of blocks. In other embodiments, the distributed ledger may comprise a plurality of collections of blocks.

Each entity of the computing devices 410, 420, 430, 440, 450 and 460 may include, but not be limited to, the requester 120 and the provider 130, for example at least one producer, at least one trader, at least one transmission operator, at least one distribution operator, at least one storage operator and at least one consumer. The computing devices 410, 420, 430, 440, 450 and 460 may include, but not be limited to, smartphone, desktop computer, laptop, tablet computer and wearable devices, in particular intelligent wearable devices such as smart watch, smart glasses or mobile virtual reality headset.

The computing devices 410, 420, 430, 440, 450 and 460 may maintain and/or update the distributed ledger. The distributed ledger may be updated periodically or from time to time with modifications to the ledger. The modifications, for example, may include, but not be limited to an insertion or an update of a ledger entry.

The computing devices 410, 420, 430, 440, 450 and 460 may be utilised as the decentralized processor and/or decentralized database. It may be appreciated that the processor 110 and database (not shown) described above may be replaced with the decentralized processor and the decentralized database. Therefore, each computing device 410, 420, 430, 440, 450 and 460 may be implemented as a plurality of nodes for storing a copy of the ledger. The ledger may be collaboratively maintained by anonymous peers on a network 470. In some embodiment, the ledger may be only maintained and stored on a set of trusted nodes, for example computing devices of authorized users.

In some embodiments, the ledger may be used for a record of the goods and/or service related information, for example energy related information. The energy related information may include, but not be limited to, at least one of producer related information, transmission related information or storage related information. As described above, the computing devices 410, 420, 430, 440, 450 and 460 may be utilised as a decentralized processor as well as decentralized database.

Each computing devices 410, 420, 430, 440, 450 and 460 may be referred to as "nodes" of the system 100. The number of nodes may vary or be fixed. The ledger copies which are maintained and stored on each node enable cross-validation with one another. For example, when a conflict event occurs between ledger entries, the computing devices 410, 420, 430, 440, 450 and 460 are operable to conduct the cross-validation with one another. Hence, the energy related information recorded in the distributed ledger may be secured even though the conflict event occurs.

In addition, the ledger may be used to track the changes of the energy related information. The ledger may have entries linked to one another using cryptographic information of the good and/or services, for example energy. Further, the ledger may be ordered and time stamped, to prevent from double transfers and/or unauthorized tampering or modification of the ledger entries.

Although not shown, the system 100 may further comprise a regulator (not shown) and a metering monitor (not shown) to regulate and monitor the energy at the provider's 130 side. It may be appreciated that the regulator and the metering monitor may also be entities of computing devices. These computing devices may also be utilised as a decentralized processor as well as decentralized database.

Figure 4:
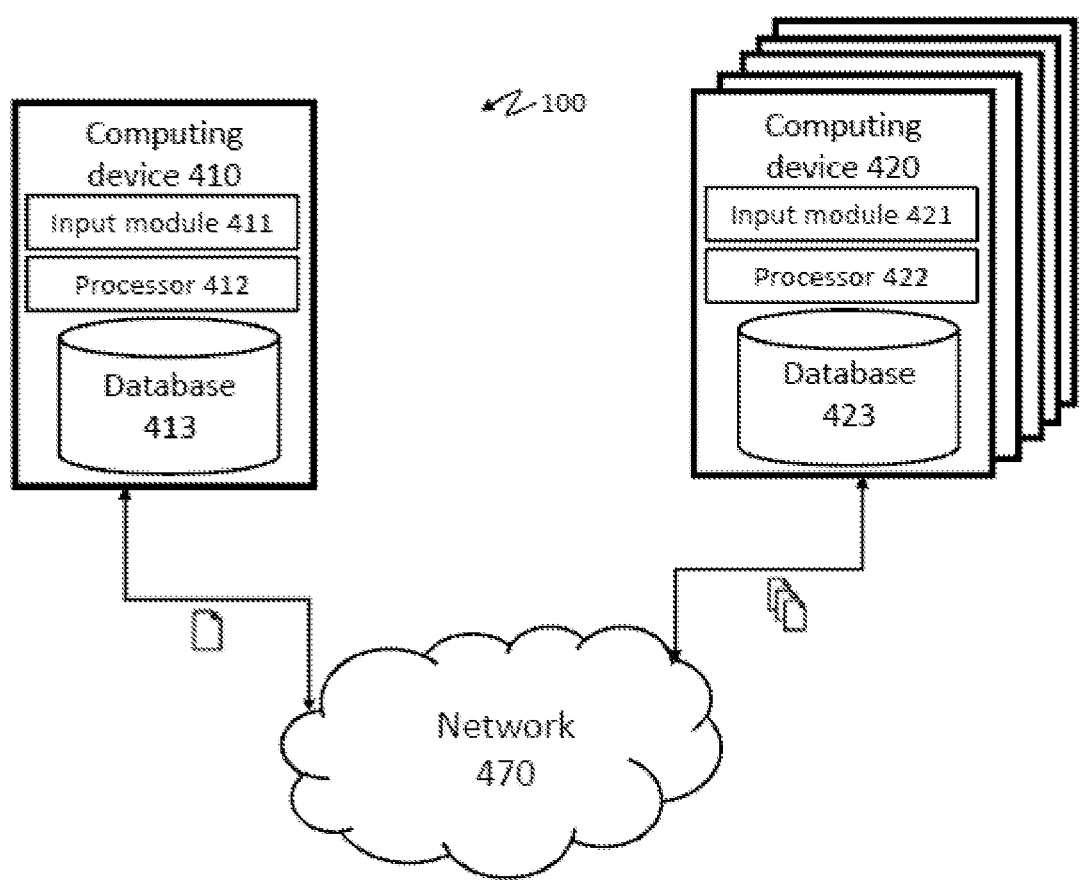
FIG. 4 shows another block diagram in accordance with some embodiments of the present invention.

FIG. 4 shows another block diagram in accordance with some embodiments of the present invention.

The computing devices 410, 420, 430, 440, 450 and 460 may comprise an input module, a processor and a database. It may be appreciated that this processor and this database may be a distributed processor and a distributed database. It may be appreciated that a combination of a centralized processor and a distributed processor can be used in some embodiments. It may also be appreciated that a combination of a centralized database and a distributed database can be used in some embodiments. It may also be appreciated that only a centralized processor and a centralized database can be used in some embodiments.

For example, a computing device 410, for example a storage operator's computing device, may generate and manage the energy related information using an input module 411, a processor 412 and a database 413. The input module 411 may include, but not be limited to, an image scanning device, a manual input device and a voice input device. In this manner, if there are any changes on the energy related information, for example if the capacity of the stored energy has been changed due to decay, the computing device 410 of the storage operator may generate information accordingly.

The energy related information is maintained using blocks organised in blockchains stored in the database 413 of the computing device 410. Although not shown, the energy related information is also maintained using blocks organised in blockchains stored in databases of the other computing devices 420, 430, 440, 450 and 460 via the network 470.

In some embodiments, a token is used to represent each type of asset functionality such as production, transportation and storage. Each asset may also have their own token(s), such tokens being assigned or generated for the relevant asset.

In some embodiments, in an energy related activity, there may be three (3) tokens for power, transmission and storage capacity which relate to producer, transmission operator and storage operator respectively. Each token may be represent unit of "MW" for power.

In some embodiments, in a time sensitive or perishable goods related activity, the goods may include rice. Rice farmers may be producers of paddy. The rice mills may be consumers, since the rice mills buy the paddy and mill it to produce rice. The transportation companies may be transmission operators to deliver the paddy from farms to the rice mills via silos. The silos may be storage operators. For example, the farmers may send the paddy to the rice mills directly. As another example, the rice mills may buy the rice from the farmers and store the rice at the silos first. There may be three (3) tokens as follows: a paddy token representing one (1) token per 1 kg; a transportation token representing the transfer of 1 kg of rice from point A to point B; and a storage token representing 1 kg storage space at a silo. Each token may represent unit of "kg". As another example, each token may represent unit of "Ton" for rice.

In some embodiments, the goods may include sugar cane. Sugar farmers or plantations may be producers of the sugar cane. Sugar factories may be consumers, since the sugar factories consume the sugar cane to produce sugar. The sugar factories may also be producers of the sugar. The transportation companies may be transmission operators to deliver the sugar cane from the plantations to the sugar factories. Warehouses may be storage operators.

The token may be issued by the system 100 when a contract is formulated either in spot trading or future contract scenario. The token price may be determined in accordance with the buy-sell transaction of the contract.

The traders or consumers can buy token to secure the production, transmission and storage capacity. The traders or consumers can resell the token to other parties, for example other traders or other consumers. The trading may be limited or restricted by regulations in the market or country. In such case, the smart contract or software system may be used to enforce the regulation. In some embodiments, the goods could be other perishable foods such as dairy products (milk, eggs), seafood, fruits and vegetables with very similar arrangements and logistics to the cases of sugar cane and rice paddies presented here. For example, milk can be refrigerated, seafood can be frozen and thus storage mechanisms are possible. The proposed system can be applied to any other application which is structurally isomorphic to the power provision problem elaborated in the present application. The isomorphism means that although one is dealing with different labels, for example, a farmer of dairy products rather than an electrical power station: one nonetheless obtains the same graph of relationships between the various terms. Other variables such as time constraints may also vary. For example, dairy products perish over a much shorter time period than power storage units. However, in the end, the final outcome is a cost optimization using essentially the same methodologies.

Figure 5:
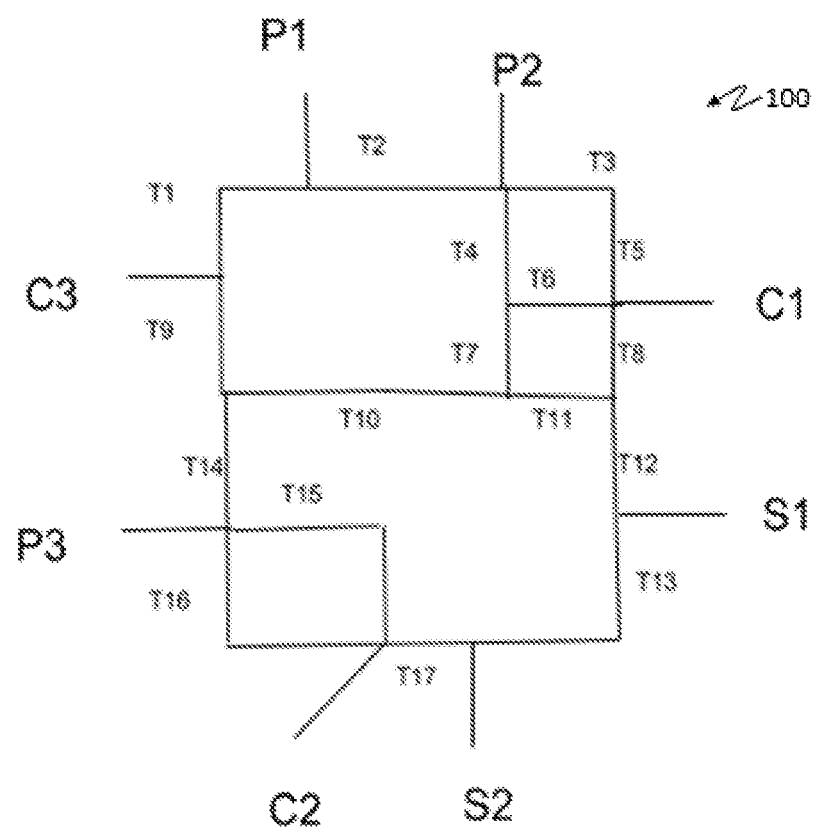
FIG. 5 shows an example of the parties in accordance with some embodiments of the present invention.

FIG. 5 shows an example of the parties in accordance with some embodiments of the present invention. FIG. 5 shows producers (P1, P2, P3), storage operators (S1, S2), consumers (C1, C2, C3) and transmission operators (T1 to T17).

The role of producers (P1, P2, P3) may be to produce the goods or services, for example energy. The energy can be generated from any sources, for example wind, solar, gas, or water. The producers (P1, P2, P3) may have the following properties as the energy related information:

Price per MW
Geolocation
Capacity (MW): The capacity may be different depending on time period. For example, solar power plant may not have capacity at night time.
Energy source type (Coal, water, solar, wind, battery, etc.): These could be used for carbon trading or let the consumers (C1, C2, C3) choose the type of energy they prefer.
Grid connectivity.

The role of the storage operators (S1, S2) may be to store the energy. The storage operators (S1, S2) may have the following properties as the energy related information:

Price per MW
Geolocation
Storage capacity (MW)
Charging rate of the energy (MW/Hr)
Discharging rate of the energy (MW/Hr)
Decay factor or formula
Grid connectivity.

In some embodiments, the storage means for the storage operators (S1, S2) may be in the following states: charging state, idle state and discharging state. During the charging state, the storage means may consume the energy. If the storage means is in idle state, the storage means may discharge the energy slowly. Therefore, the decay factor or decay formula may be used to describe the discharging characteristic.

In some embodiments, the decay factor of the storage operators (S1, S2) may be predetermined at the time of audit as the storage operators (S1, S2)' characteristics by the storage operators (S1, S2) themselves. When the consumers (C1, C2, C3) or traders (Tr1, Tr2, Tr3) want to buy the energy and move the energy into a storage for a later use or resale, the storage operators (S1, S2) need to publish the decay factor and/or discharge rate, so that consumers (C1, C2, C3) or the traders (Tr1, Tr2, Tr3) can aware that his stored asset, e.g. the energy, is also depreciating in value.

When the energy is drawn from the storage means, the storage operators (S1, S2) may act in the role of the producers (P1, P2, P3).

The role of the transmission operators (T1 to T17) may be to transfer the energy from point A to point B. As shown in FIG. 5, the producers (P1, P2, P3), the storage operators (S1, S2) and the consumers (C1, C2, C3) may be connected to transmission links of the transmission operators (T1 to T17). The transmission operators (T1 to T17) may have the following properties as the energy related information:

Geolocation start point and geolocation end point
Capacity (MW)
Loss percentage
Grid connectivity
Price per MW.

In an energy distribution, the transmission means may have different voltage and connect to a substation or step-up/step-down transformer.

As shown in FIG. 5, the transmission lines are represented by links. A node may be a producer, a consumer, a storage operator or both. For example, a windmill power plant is a producer. An energy storage facility may be in a consumer role during charging of the energy and in a producer role during discharging of the energy. The node may also be a substation, transformer or anything that links two transmission lines together.

In some embodiments, if a consumer (C3) wishes to buy a power, the consumer (C3) may bid for 300 MW/Hr power at 10 cent per 1 MW/hr. A trader (Tr1, not shown) may buy power from a producer (P3) using transmission operators (T9, T14) to sell to the consumer (C3) (hereinafter referred to as "a first route"). A trader (Tr2, not shown) may buy power from a producer (P2) using transmission operators (T1, T2) to sell to the consumer (C3) (hereinafter referred to as "a second route"). A trader (Tr3, not shown) may obtain transmission capacity from a transmission operator (T9) and sell to the consumer (C3) (hereinafter referred to as "a third route").

The processor 110 may analyse the first route, the second route and the third route using the energy related information. Thereafter, the processor 110 or the consumer (C3) may select at least one route, for example the first route, based on the analysis. The processor 110 may match the consumer (C3) with the trader (Tr1), the producer (P3) and the transmission operators (T9, T14) for the transaction of the power. The processor 110 may execute one or more smart contract(s) between the consumer (C3), the trader (Tr1), the producer (P3) and the transmission operators (T9, T14). The smart contract and the transaction result can be updated on the database.

In this manner, a trader may buy and/or sell capacity and/or power from a producer, a storage operator and a transmission operator. Some of the properties for the trader may include, but not be limited to, bid price, offer price and capacity. The power may be bought by spot trading and/or future trading. In some embodiments, the spot trading may be achieved in few minutes. In some embodiments, the spot trading may include trading achieved from few minutes (i.e. intraday) to a day ahead. In some embodiments, the future trading may include trading achieved more than a day ahead. The length of the future trading may vary, for example few days, few months or few years.

It may be appreciated by the person skilled in the art that variations and combinations of features described above, not being alternatives or substitutes, may be combined to form yet further embodiments falling within the intended scope of the invention.

The invention claimed is:

1. A method comprising an automated control process to route and regulate electric utility transactions and selectively reserve portions of an electric power grid for carrying out the electric utility transactions, the method comprising:
providing an electric utility transaction facilitating system that corresponds to portions of an electric power grid having:
provider nodes that can provide electric power and which are associated with providers of electric power;
requester nodes associated with requesters of electric power; and
power lines that can link provider nodes with requester nodes for transmission of electric power produced by provider nodes to requester nodes subject to electric power grid connectivity,
wherein a given provider node can include a producer of electric power or an electric power storage facility during discharge of electric power therefrom, and a given requester node can include an electric power consumer or an electric power storage facility during charging of electric power therein, and
wherein the electric utility transaction facilitation system comprises a computer network having a plurality of facilitating system computing devices which:
(a) includes computing devices corresponding to provider nodes and requester nodes of the electric power grid;
(b) provides each of (i) a decentralized processor operable to automatically route and regulate electric utility transactions and selectively reserve portions of the electric power grid for carrying out the electric utility transactions, and (ii) a decentralized database including a distributed ledger; and
(c) comprises at least some of a smartphone, a desktop computer, a laptop computer, a tablet computer and an intelligent wearable device selected from a smart watch, smart glasses, and a mobile virtual reality headset;
receiving, by a first facilitating system computing device, a request from a requester made on a requester computing device associated with a requester node and associated with a transaction of electric power, wherein the requester node can be connected by at least one power line to at least one provider node associated with at least one provider;
receiving, by the first facilitating system computing device, energy information corresponding to at least one of a regulator on the at least one power line configured to regulate power output by the at least one provider node and a metering monitor on the at least one power line configured to sense and monitor power output supplied by the at least one provider node;
using the decentralized processor to automatically:
figure out the transaction based on the received request and the energy information;
provide at least one list of a plurality of routes connecting between the requester node and the at least one provider node which, based on the energy information, can provide the electric power to the requester node by way of one or more power lines;
analyze the plurality of routes by calculating costs for the routes based on electric utility related information corresponding to the at least one provider node, which is provided via at least one provider computing device and which is stored in the decentralized database in communication with the decentralized processor, wherein the cost calculation by the decentralized processor is also based on the following mathematical expression:

$$\min \sum_{i \in [n]} \left( (P_i + Pdecay_i) \times p_i + \sum_{j \in [k(i)]} (Tloss_{ij} \times p_{ij} + Tcost_{ij}) \right)$$

wherein $[n]=\{1,2,3,\ldots(n-1),n\}$ is a set of power grid provider nodes, $[k(i)]$ is a set of connected power lines between the requester node and the at least one provider node, p is the unit price, P is the power source, Tloss is the power loss in a power line (ij), Tcost is a cost of the power line (ij), i belongs to the set [n] i.e.{i} is a non-empty subset of [n], j belongs to the set [k(i)] i.e. {j} is a non-empty subset of [k(i)], and Pdecay is a power decay constant;
select at least one route with the least calculated cost among the plurality of routes based on the analysis of the routes;
the requester node with a particular provider node associated with the selected route upon receipt of the requester's confirmation on the selected route;
execute a smart contract between the requester and particular provider corresponding to the particular provider node associated with the selected route;
reserve at least one power line associated with the selected route, to ensure that the electric power provided by the particular provider node is provided to the requester node instead of other requester nodes; and update the decentralized database to record the smart contract and the reservation of the last least one power line associated with the selected route.

2. The method according to claim 1, wherein the electric utility related information includes at least one of the following: producer related information, transmission related information and storage related information.

3. The method according to claim 1 further comprising the step of sorting, by using the decentralized processor, the plurality of routes based on each of the electric utility related information associated with the request in order to select the at least one route.

4. The method according to claim 3 further comprising the step of filtering, by using the decentralized processor, the plurality of routes based on each of the electric utility related information associated with the request and reliability of service information associated with each of the plurality of routes, in order to select the at least one route.

5. The method according to claim 1 further comprising the step of providing, by using the decentralized processor, the requester with options of the plurality of routes through the requester computing device, so that the requester can select the at least one route.

6. The method according to claim 1 further comprising the step of sending, by using the decentralized processor, details of the selected route to the requester computing device, so that the requester can send a confirmation of the selected route to the decentralized processor.

7. The method according to claim 1 further comprising the steps of receiving feedback from the requester with regard to the particular provider associated with the selected route, by the decentralized processor which then records the feedback on the decentralized database.

8. The method according to claim 1, wherein the distributed ledger comprises a plurality of blocks, and each block of the plurality of blocks stores the electric utility related information.

9. The method according to claim 1, wherein the request contains at least one of the following information: desired location, capacity, time or duration.

10. The method according to claim 1, wherein the method is completed within two minutes.

11. The method according to claim 1, wherein the method is completed in real-time.

12. The method according to claim 1, further comprising:
providing electrical power from the particular provider node to the requester node over the reserved at least one power line of the selected route.

* * * * *

UNITED STATES PATENT AND TRADEMARK OFFICE
CERTIFICATE OF CORRECTION

| | |
|---|---|
| PATENT NO. | : 11,481,719 B2 |
| APPLICATION NO. | : 16/205133 |
| DATED | : October 25, 2022 |
| INVENTOR(S) | : Ahunai et al. |

Page 1 of 1

It is certified that error appears in the above-identified patent and that said Letters Patent is hereby corrected as shown below:

On the Title Page

The (73) Assignee should read:
ENERGY ABSOLUTE PUBLIC COMPANY LIMITED (Bangkok, TH) and BLOCKFINT COMPANY LIMITED (Bangkok, TH)

Signed and Sealed this
First Day of April, 2025

Coke Morgan Stewart
*Acting Director of the United States Patent and Trademark Office*